(12) United States Patent
Wu et al.

(10) Patent No.: US 11,270,234 B1
(45) Date of Patent: Mar. 8, 2022

(54) INFERENCE-BASED COMPUTATIONAL ALIGNMENT OF DATA SETS

(71) Applicant: Microsoft Technology Licensing, LLC, Redmond, WA (US)

(72) Inventors: Pan Wu, Sunnyvale, CA (US); Meredith A. Jones, Sunnyvale, CA (US); Sally Limb, San Francisco, CA (US); Qi Chen, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 97 days.

(21) Appl. No.: 16/020,965

(22) Filed: Jun. 27, 2018

(51) Int. Cl.
*G06Q 10/06* (2012.01)
*G06N 5/04* (2006.01)

(52) U.S. Cl.
CPC ....... *G06Q 10/063112* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 7,555,441 B2 | 6/2009 | Crow et al. | |
| 2007/0203711 A1* | 8/2007 | Nation | G09B 5/00 434/350 |
| 2016/0092998 A1* | 3/2016 | Goel | G06Q 50/01 705/319 |
| 2017/0032322 A1* | 2/2017 | Grover | G06Q 10/1053 |
| 2017/0154310 A1* | 6/2017 | Duerr | G06Q 50/01 |
| 2018/0232751 A1* | 8/2018 | Terhark | G06Q 10/063118 |
| 2019/0102687 A1* | 4/2019 | Terra | G06F 3/0486 |
| 2020/0005215 A1 | 1/2020 | Wu et al. | |

OTHER PUBLICATIONS

"Non Final Office Action Issued in U.S. Appl. No. 16/020,954", dated Feb. 21, 2020, 33 Pages.
"Final Office Action Issued in U.S. Appl. No. 16/020,954", dated Jun. 12, 2020, 50 Pages.

* cited by examiner

*Primary Examiner* — Patricia H Munson
*Assistant Examiner* — Marjorie Pujols-Cruz
(74) *Attorney, Agent, or Firm* — Schwegman Lundberg & Woessner, P.A.

(57) ABSTRACT

Technologies for using an inferred relationship between data sets to computationally align the data sets and generate actionable output include obtaining, from an online system, a set of member records; inferring a job category based at least partly on job function data extracted from the set of member records; obtaining, from the management system, a set of job records that correspond to the inferred job category; calculating an aggregate alignment score by comparing member skills data extracted from the set of member records to job skills data extracted from the set of job records, where the aggregate alignment score is a measure of a mismatch between the member skills data for the set of member records and the job skills data for the set of job records; based on the aggregate alignment score, identifying a skill that is actionable to address the mismatch between the member skills data and the job skills data; generating actionable output that replaces, modifies, or supplements first course recommendation data that does not map to the identified skill with second course recommendation data that maps to the identified skill.

11 Claims, 8 Drawing Sheets

INFERENCE-BASED COMPUTATIONAL ALIGNMENT OF DATA SETS

TECHNICAL FIELD

The present disclosure relates to networks that are processed by data processing systems, and more particularly to computer software that computationally aligns data obtained from heterogenous data sets in a networked system in order to produce actionable output.

BACKGROUND

Online systems can be used to match end user data with opportunity data. Some online systems can generate recommendations as to next opportunities to be considered by an end user, such as job opportunities and recommendations for personal growth.

A limitation of the existing technologies is that they are biased to look for similarities, rather than differences, between the individual data records being matched. As a result, existing systems are not effective when there are substantial differences between the end user's data record and the opportunity data record. For example, existing systems cannot generate actionable output that is specifically targeted to address mismatches that are identified by the data record comparison processes. Moreover, existing approaches do not measure the degree to which an entire group or category of member data matches opportunity data across an entire group or category of opportunities. Still further, existing approaches do not determine the set of opportunity data records based on an inferred data relationship with the end user records. These limitations of existing approaches are due in large part to the inability of the prior data processing technologies to handle the high computational requirements of more sophisticated analyses.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1A:
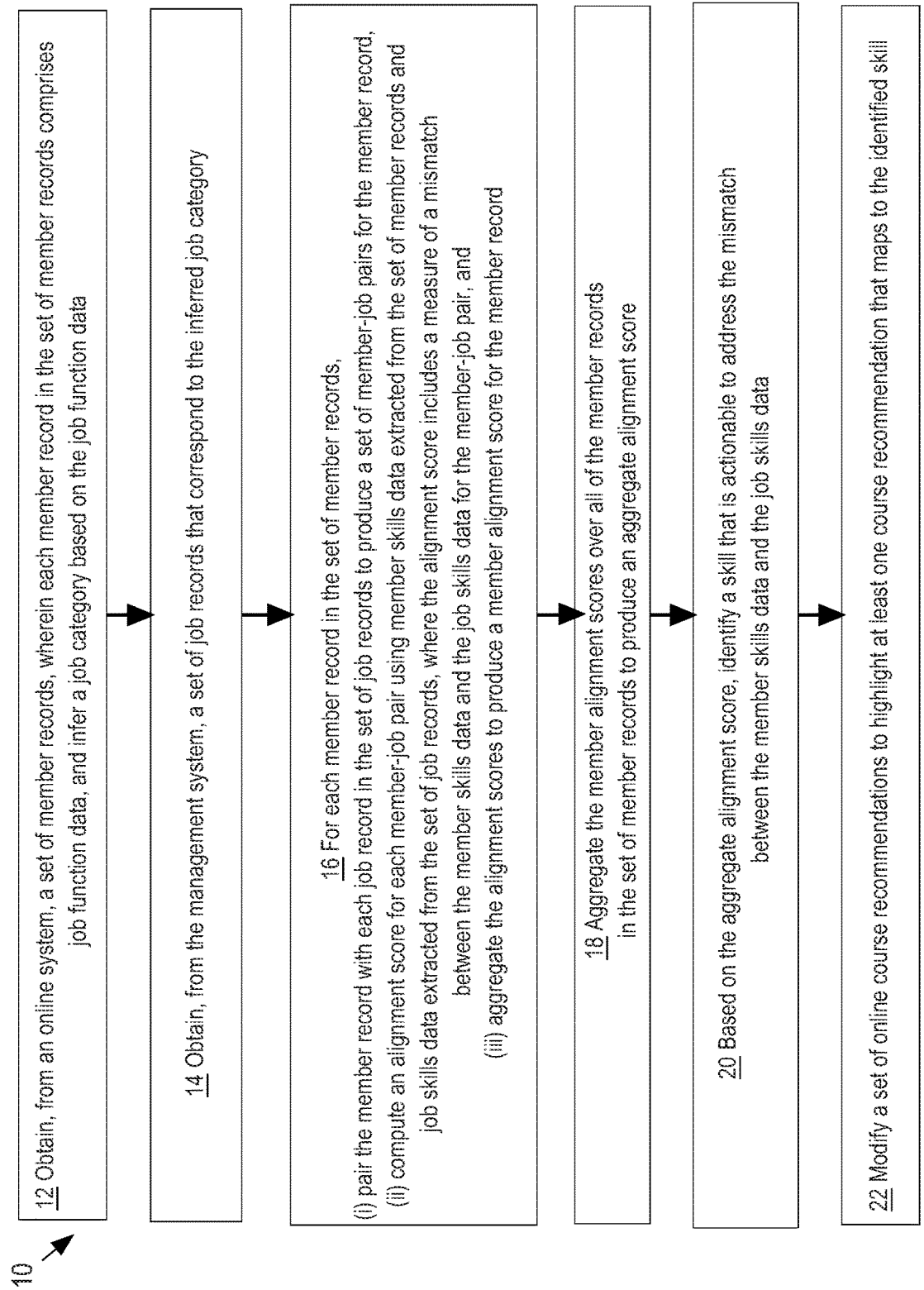
FIG. 1A is a flow diagram that depicts a process for generating actionable output based on a computational alignment of data sets that have an inferred data relationship, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A technical limitation of existing opportunity recommendation software products is that they are unable to effectively handle the computational burden of inferring a data relationship between heterogenous data sets and aligning the data sets that have the inferred data relationship. Another limitation of existing systems is that they tend to disregard pairs of data records that have low matching scores. This is because the existing products rely on the assumption that a high degree of similarity is a strong indicator of a good match. However, in a networked system, data records can be manipulated, compromised due to hacking, or even purposefully generated or modified to achieve a desired result. Because similarity-based matching scores can be artificially enhanced or purposefully engineered, the matches that are produced can be inaccurate and unreliable.

As disclosed herein, the manner in which existing opportunity recommendation systems perform matching is improved by adding technology that implements a particular approach to a computational matching process that determines the data records to be matched based on an inferred relationship between the data sets from which the data records are extracted. The disclosed approaches do not rely on a high degree of similarity as a determinant of a good match, although the disclosed approaches can be used in conjunction with or as an alternative to other approaches that do so.

The disclosed approaches improve the process of generating course recommendations for users of an online system. In one particular application, the disclosed approaches improve the integration of a learning system, such as the LINKEDIN LEARNING online learning system, with an online networking platform, such as the LINKEDIN professional social network. The disclosed approaches identify online training courses that target skill mismatches between a current set of skills of a group of members of the online networking platform and a set of reference skills that are identified based on an inferred data relationship between the member records and a set of job records of an online job posting service.

The disclosed approaches produce actionable output based on the computed measure of alignment between the aggregate job skills data and the member data. In an embodiment, the disclosed techniques are implemented as part of a programmable interface between a management system, such as an opportunity listing service, and an online system that has or uses a connection graph, such as a professional social network, using course information extracted from an online learning platform. In other embodiments, the disclosed approaches are implemented entirely within the online system or entirely within the management system, or entirely within the online learning platform.

In some embodiments, the actionable output produced by the disclosed approaches is used to identify particular online courses that are available through the online learning platform. The identified courses address a mismatch between the aggregate opportunity data and the aggregate member data. The mismatch is identified as a result of the disclosed computational alignment processes. The actionable output includes, for example, electronic messages, news feed modules, content items uploaded to a media channel, graphical user interface pages. In some embodiments, the actionable output includes deep links to recommended courses. Deep link as used herein refers to a form of hyperlink that links directly to a content page other than the top-level content page of a Web-based application. For example, deep linking as used herein refers to a direct link to an online course within an online learning system rather than the top-level application page of the online learning system.

In one approach, a set of member records is obtained from an online system. Each member record in the set of member records includes job function data. A job category is inferred based at least partly on the job function data. A set of job records of a management system are identified, which correspond to the inferred job category. The set of job records is obtained from the management system. An aggregate alignment score is calculated by comparing member skills data extracted from the set of member records to job skills data extracted from the set of job records that have a data linkage with a member record in the set of member records. The aggregate alignment score is a measure of a mismatch between the member skills data for the set of member records and the job skills data for the set of job records.

Based on the aggregate alignment score, a skill is identified that is actionable to address the mismatch between the member skills data and the job skills data. Actionable output is generated that replaces, modifies, or supplements previously-generated course recommendation data that does not map to the identified skill with new course recommendation data that maps to the identified skill.

Generation of Actionable Output Based on Alignment Scores

FIG. 1A is a flow diagram that depicts a process 10 that is performed by one or more components of a computing system 100, shown in FIGS. 1B and 1C, described below, in an embodiment. In some embodiments, portions of process 10 are performed by skills alignment software 48 and recommendation software 50, shown in FIG. 1B, described below. In some embodiments, skills alignment software 48 is a component of score computation software 122 of skills alignment system 120 and recommendation software 50 is a component of presentation layer 118 of recommendation system 114, shown in FIG. 1C. Portions of process 10 may be performed by a single entity or program or by multiple entities or programs, including for example a browser plug-in and a remote server.

The operations of the process as shown in FIG. 1A are implemented using processor-executable instructions that are stored in computer memory. For purposes of providing a clear example, the operations of FIG. 1A are described as performed by computing device(s) 110, 160, which may be individually or collectively referred to simply as a 'computing system.'

In operation 12, process 10 obtains, from an online system, a set of member records, where each member record in the set of member records includes, stored within it, job function data. An example of a member record is a member profile that is maintained by an online system, such as a professional social networking system. Examples of job function data include a job title, a list or description of job responsibilities, a department name (e.g., software developer, develop cybersecurity software, engineering). Job function data includes individual items of data and combinations of different data items, in various embodiments. An example of a job record is a job listing posted in and maintained by a management system, such as an online job listing service.

In an embodiment, the set of member records is filtered by one or more dimensions of the member data record. Examples of dimensions that are used for creating or filtering the set of member records include employer, job title, department, and project team. An example of an employer is a particular company's name. An example of a job title is project manager. An example of department is human resources. An example of project team is network security team.

In different embodiments, filtering of the member records by different dimensions is performed prior to computation of alignment scores and/or after the alignment scores are computed. For instance, a first set of member data may include members who all work in the same department at a particular employer (filter dimensions=employer and department). Alignment scores may be computed for the individual members in this first set of member records, and then those alignment scores may be aggregated to produce an aggregate alignment score for the entire department. Alternatively, or in addition, a different filter dimension can be specified for the aggregate score computation. For example, aggregate alignment scores can be generated for subsets of the member records that correspond to particular job titles or years of service, such as all senior software engineers or all employees in the department that have been with the company for less than a year.

Also in operation 12, a job category is inferred at least partly from the job function data that is extracted from the set of member records. Examples of inferred job categories include industry names and job titles that are different from the job titles that are extracted from the member records. In some embodiments, a goal input is used in combination with the job function data to infer the job category. An example of a goal input is a "stay competitive" indicator, which indicates that the system is used to identify opportunities for skill growth, and corresponding course recommendations, with respect to a member or members' current job function, in order to stay competitive in their industry. Another example of a goal input is a "career advancement" indicator, which indicates that the system is used to identify skills that a member or members need to develop in order to advance to a higher level within their current profession.

In an embodiment, the job category is inferred using a searchable knowledge base that stores semantic relationships between different words and phrases. For example, member records may contain employer name data but not industry name, but a semantic graph, such as WordNet, can be used to determine the industry within which the employer operates. Similarly, the job category be inferred from combinations of words stored in the member records that describe the members' current job responsibilities, in an embodiment. Aspects of the job category are inferred from dates and/or numerical data within the job record, in an embodiment. For example, if the start and end dates of employment are less than a year apart, the inferred category may be "level 1 software engineer" as opposed to "senior software engineer." Similar automated inferencing processes are applied to goal inputs, when available. For example, upon obtaining a goal input of "career advancement," the system traverses a semantic graph to determine higher level job titles that correspond to the members' current job title in the same profession or industry. In some embodiments, mapping tables are used alternatively or in addition to more sophisticated semantic graphs. For example, a database table that stores relationships between job titles based on goal inputs is predefined based on requirements of a particular design of the system.

In operation 14, process 10 obtains, from the management system, a set of job records, where the job records in the set of job records correspond to the job category that is inferred in operation 12. Operation 14 determines and obtains the job records from the management system that satisfy the inferred data relationship (e.g., "stay competitive in software industry" or "get promoted in current profession").

The set of job records that satisfies the inferred data relationship determined in operation 14 is filtered by one or more dimensions of the job data record, in an embodiment. Examples of dimensions that are used for creating or filtering the set of job records include industry, job level, job title, posting date. An example of an industry is cybersecurity. Examples of job levels are entry-level, mid-level, senior, executive. An example of a job title is data scientist. An example of a posting date is the month, day, and year that the job record was made available/searchable through the management system. Filtering of job records by any combination of filter dimensions can occur prior to or after computation of aggregate alignment scores, in a similar manner as described above.

The filter dimensions used to select or filter member data records and/or job data records are pre-programmed or determined based on user interaction(s) with the online system or the management system, in some embodiments. Examples of user interactions include a user inputting a keyword into an input box and a user selecting a filter dimension from a pull-down list, in a graphical user interface. Examples of technology that are used, in some embodiments, to obtain member records and job records from their respective data sources (e.g., searchable databases within the online system and the management system, respectively) are structured query language (SQL)-based tools, such as SPARK SQL and/or APACHE HIVE, which are both maintained by the Apache Software Foundation.

In operation 16, process 10 iteratively processes individual member records in the set of member records determined in operation 12. For each member record, operation 16 pairs a member data record obtained from an online system in operation 12 with each job record in the set of job records obtained from the management system in operation 14, to produce a set of member-job pairs for the member record. The group of job records that is paired with the member record is determined based on at least the inferred data relationship as discussed above.

To implement the pairing process, operation 16 instantiates a data structure, such as a tuple, with the member identifier (ID) of the member data record and the job ID of the job data record. An example of a tuple that pairs a member record with each of a plurality of job records associated with job category data is: [(M1, J1), (M1,J2), (M1,J3)], where M1 is the member ID and J1, J2, J3 are the job IDs of each of the job records in the job category.

Figure 2:
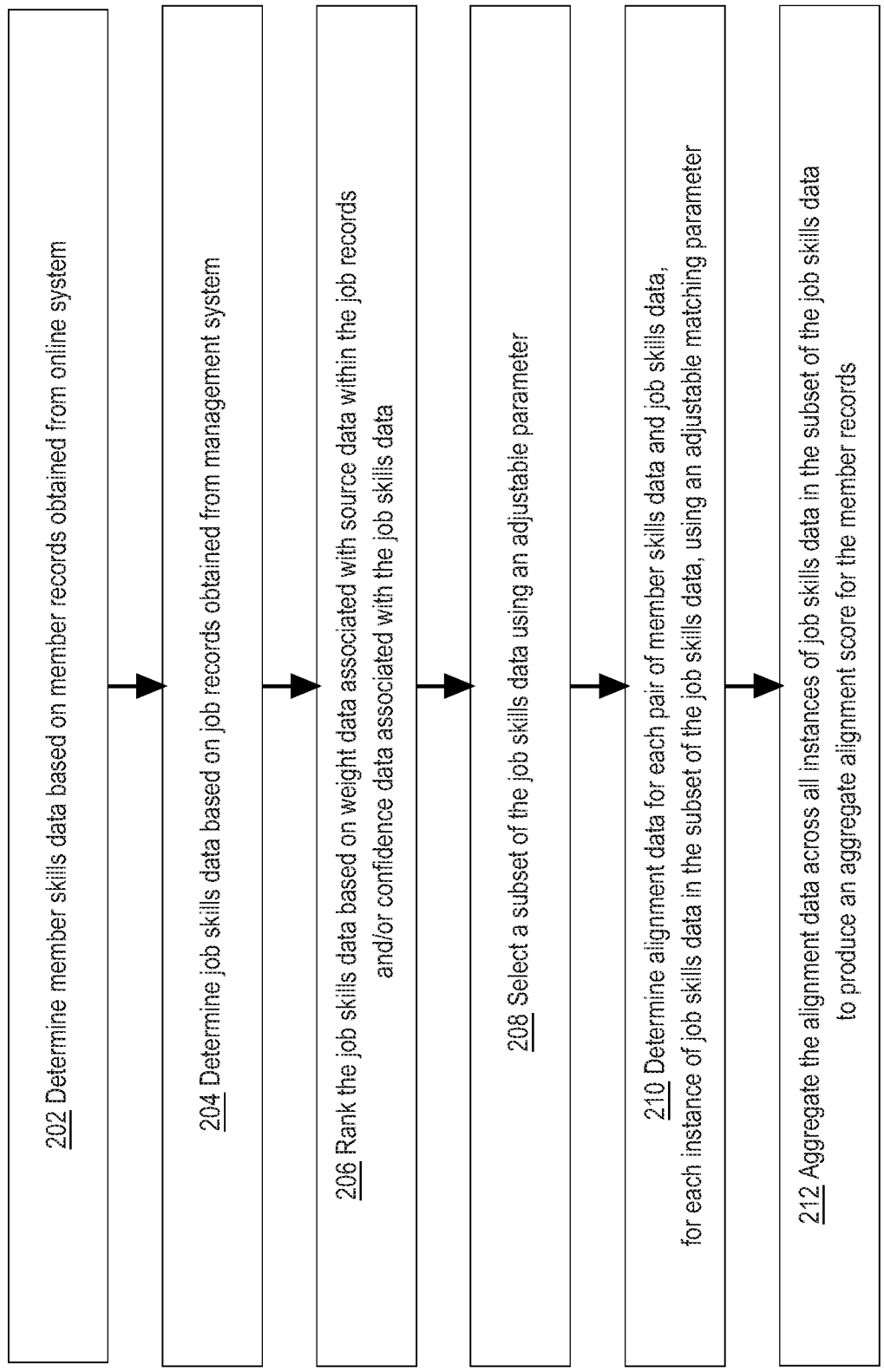
FIG. 2 is flow diagram that depicts a process for computationally aligning datasets, in an embodiment.

Also in operation 16, process 10 computes an alignment score for each member-job pair using member skills data extracted from the set of member records and job skills data extracted from the set of job records, where the alignment score includes a measure of a mismatch between the member skills data and the job skills data for the member-job pair, and aggregates the alignment scores to produce a member alignment score over all of the job records that are paired with each member record. An example of a process for computing the alignment scores for individual member-job pairs is shown in FIG. 2, described below.

The member skills data includes structured data, such as pre-defined skill names that are stored in the member data record after having been selected from a pull-down list, for example. The member skills data also includes unstructured data, such as sentences and paragraphs that describe the member's work experience. A data extraction and standardization process operates on both the structured data and the unstructured data to produce a text-based list of member skills data, where each item in the list corresponds to a skill extracted from the member data record. Process 10 uses meta data stored within the member data record to locate skills data within the member record, in some embodiments. The data extraction and standardization process is performed outside of process 10 in some embodiments, such that process 10 simply receives the output of the data extraction and standardization process.

Similarly, process 10 uses meta data extracted from the job data record to locate job skills data within the job data record. The job skills data includes structured data, such as pre-defined skill names that are stored in the job data record after having been selected from a pull-down list, for example. The job skills data also includes unstructured data, such as sentences and paragraphs that describe the job's requirements and responsibilities. A data extraction and standardization process operates on both the structured data and the unstructured data to produce a text-based list of job skills data, where each item in the list corresponds to a skill extracted from the job data record. The data extraction and standardization process is performed outside of process 10 in some embodiments, such that process 10 simply receives the output of the data extraction and standardization process.

In operation 18, process 10 calculates an aggregate alignment score over all of the member-job pairs generated in operation 14 for all of the member records obtained in operation 12 and all of the job records obtained in operation 14. To do this, process 10 sums the alignment scores computed in operation 16. If one or more filter dimensions were specified, operation 18 computes the aggregate alignment scores according to the specified filter dimension or combinations of filter dimensions. In an embodiment, operation 18 sums the alignment scores computed in operation 16 for all member-job pairs that have member records that are associated with a common department or project team at a particular company and job records that are associated with the inferred job category.

In an embodiment, operation 18 instantiates a data structure, such as a tuple, which stores the aggregate alignment score and the filter dimensions associated with that particular aggregate alignment score, e.g.: [employer-dept, job title, industry, skill name, aggregate count of jobs in the set of member-job pairs that require the skill, aggregate number of members in the set of member-job pairs that possess the skill]. These tuples are stored in a database table, in an embodiment. In another embodiment, a second table is created that stores additional information about the alignment score calculations, such as the details described below with reference to FIG. 2.

In an embodiment, operation 18 computes the aggregate alignment score, which includes a measure of a mismatch between the member skills data and the job skills data, by tallying, for each skill in the job skills data, a count of a number of times the skill appears in the job skills data extracted from the set of job records. The count of the number of occurrences of the skill in the job skills data is used to determine a weight value, in an embodiment. Skills that have a higher number of occurrences in the job skills data have a higher weight value. The weight value is further adjusted higher if the skill is found in the member skills data, in some embodiments. In some embodiments, the weight value assigned to a particular skill is adjusted higher if the skill is found in a job record that corresponds to particular goal input. For example, if it is determined that a particular skill is required by a large number of recently posted jobs that are similar to the job functions in the set of member records, but that particular skill is missing from the set of member records, the system concludes that the skill is required for the members to stay competitive in their industry and assigns a higher weight to the skill, in some embodiments.

In an embodiment, operation 18 determines, for each skill in the job skills data, whether the skill is present in the member skills data and assigns a data value to a skill possessed indicator. In an embodiment, the skill possessed indicator is binary: a value of 0 indicates that the member does not possess the skill, and a value of 1 indicates that the member possesses the skill. In other embodiments, fractional values between 0 and 1 are used as an indicator of a level of confidence in the determination that the skill is or is not possessed by the member.

To arrive at the aggregate alignment score, operation 18 computes a ratio in which the numerator is a data value that indicates a degree to which the set of member records in the aggregate possesses the skills in the job skills data for the set of job records in the aggregate, and the denominator is a data value that indicates a weighted average of all of the skills considered in the comparison. For example, where an alignment score for an individual member is referred to as $SM(i)$, where i is from 1 to N, where N is the number of member records in the set of member records, the aggregate alignment score $SM(agg)$=the sum of $SM(i)$ to $SM(N)$, and an individual $SM(i)$=(sum of member-possessed skills)/sum of all required skills. Skills not possessed by the set of members, in the aggregate, are included in the computation of the denominator and are not included in the computation of the numerator.

In operation 20, the tuples generated in operation 18 are sorted by the aggregate count of jobs in the set of member-job pairs that require the skill. This sorting process reveals the top skills in the aggregated set of member-job pairs (e.g., in the industry associated with the set of job records, in the aggregate). Operation 20 then determines, based on the alignment scores computed in operation 16, which of those top skills are most in need by the members in the set of member records from which the member-job pairs were generated in operation 16. The alignment scores are a measure of the degree to which the members in the set of member records determined in operation 12, in the aggregate, possess or do not possess (match or mismatch) the skills required by the jobs in the set of job records determined in operation 14, in the aggregate.

Figure 4A:
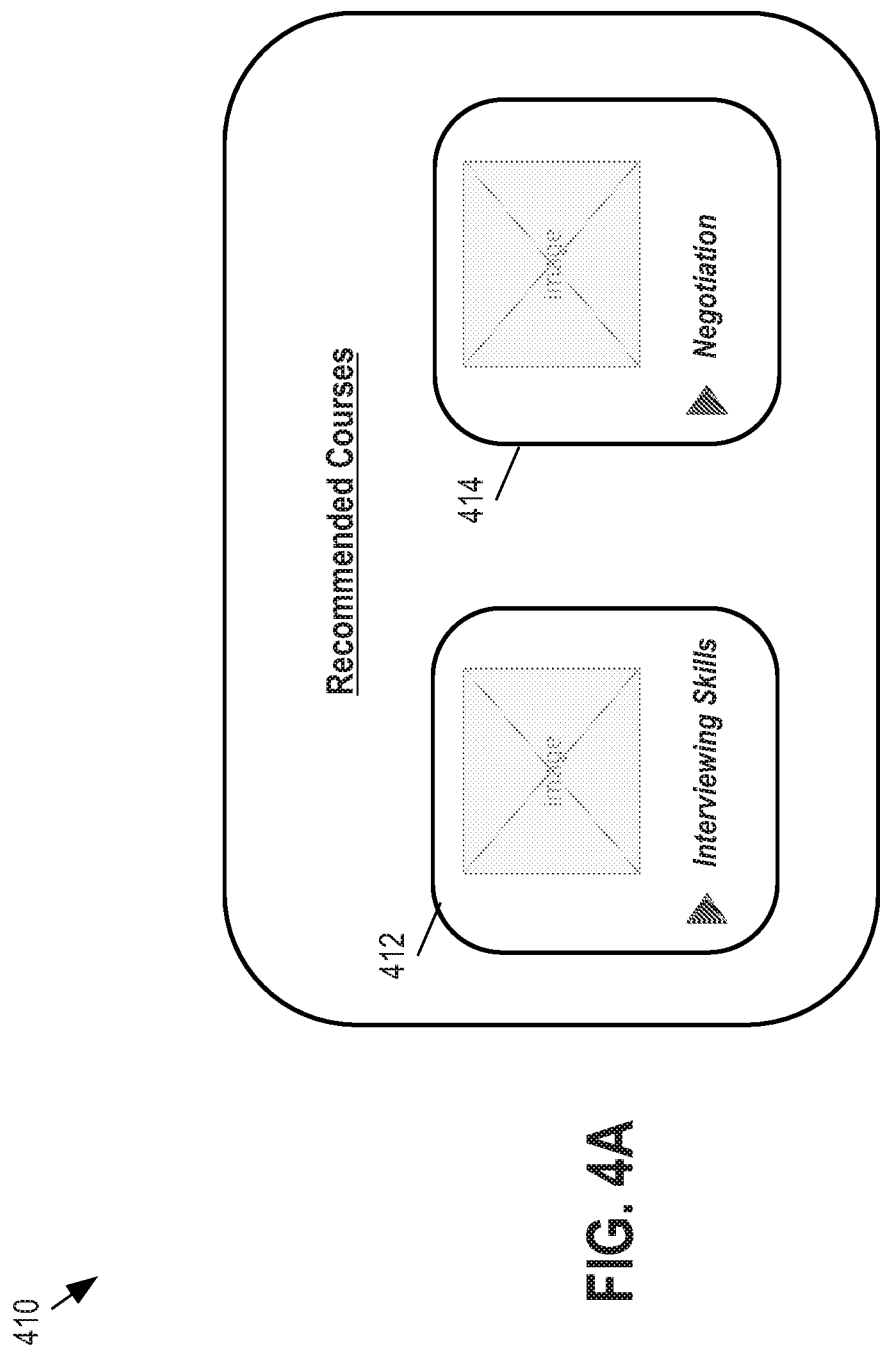
FIGS. 4A and 4B are screen captures of examples of actionable output, in an embodiment.
Figure 4B:
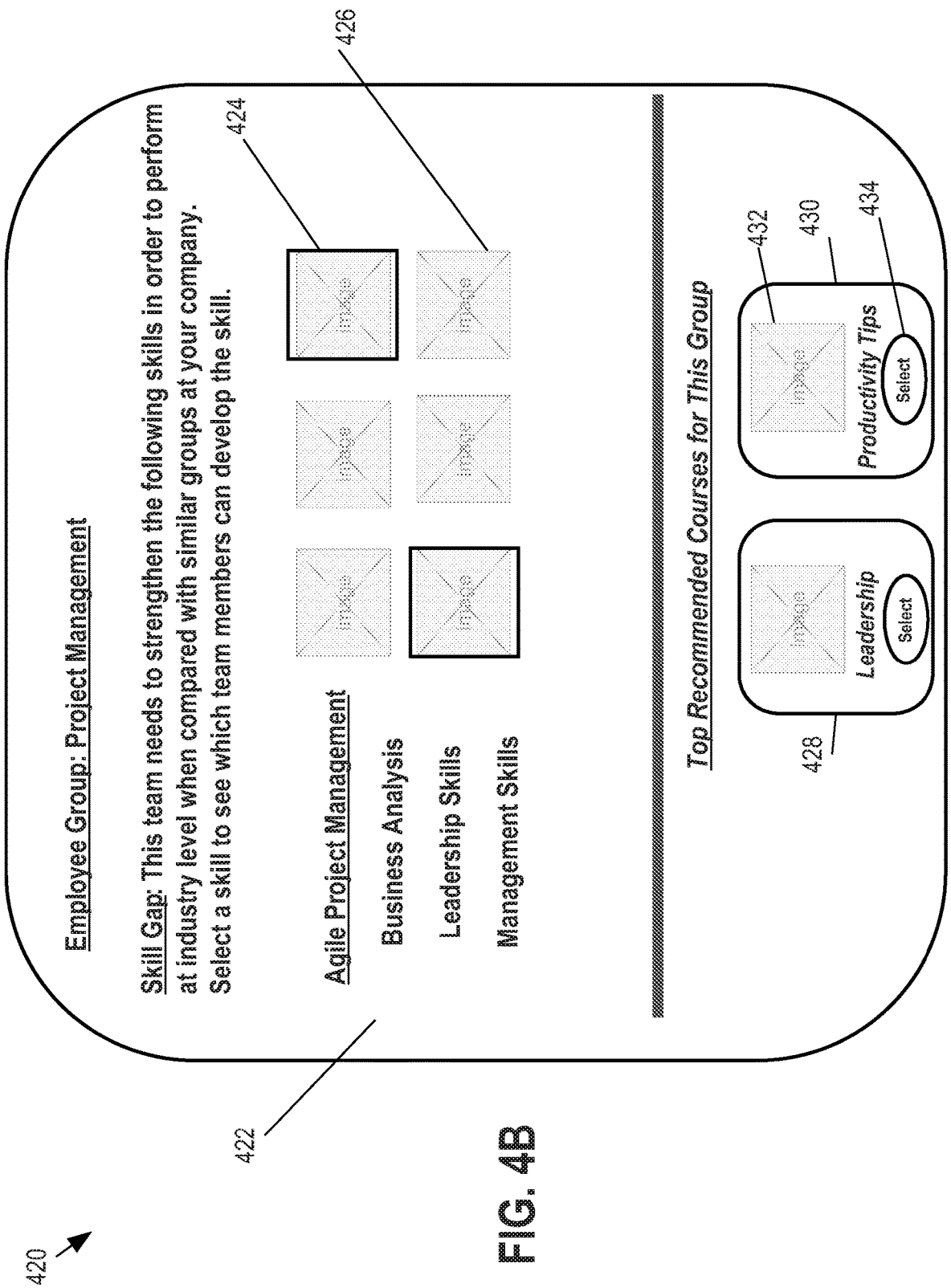

In an embodiment, operation 22 uses the aggregate alignment scores determined in operation 18 to generate output that is actionable to address the mismatch between the member skills data, in the aggregate, and the job skills data, in the aggregate. Examples of actionable output produced by operation 22 are shown in FIGS. 4A and 4B, described below. In an embodiment, generating the output by operation 22 includes causing a computing device or a display device to display a digital presentation of the generated output.

Examples of digital presentations include interactive graphical user interface (GUI) elements that can be displayed on a display screen or included in an electronic message, such as a push message, an email message, voice-based output generated by text-to-speech (TTS) software, or another form of electronic communication. In one approach, process 10 generates a visualization of the second output and transmits (or makes available) the visualization to the management system through an API function, and then the management system incorporates the visualization into a digital presentation.

In operation 22, process 10 modifies a previously-generated set of course recommendations to highlight at least one course recommendation that maps to the skill(s) identified in operation 20. An example of highlighting a course recommendation is replacing generalized course recommendations that are developed using other processes (such as viewing history of similar users), with course recommendations that are identified using the disclosed approaches. Another example of highlighting is arranging course recommendations in a graphical user interface display so that the recommendations produced by the disclosed processes appear more prominent in the graphical user interface (for example, using larger graphical elements, or by prominent placement in the graphical user interface). Another example of highlighting is including the course recommendation in an electronic message that is addressed to a member identified as lacking the skill as a result of operations 18-20.

In some embodiments, operation 22 modifies, supplements, or replaces individual member-level course recommendations with member-level course recommendations that address skill(s) that are identified in operations 18 and 20. To do this, operation 22 uses a pre-existing member-level relevance model that has been created using a logistic regression-based algorithmic process, such as a generalized linear mixed model (GLMMix). The member-level relevance model is created using the one to one member to job comparison processes mentioned above.

Alternatively, or in addition to the member-level course recommendations, operation 22 generates aggregate or group-level course recommendations which are based on the aggregate alignment scores computed in operation 20. To do this, operation 22 sums the number of times each course is recommended for the set of member records obtained in operation 12, as filtered by the applicable filter dimensions (e.g., university-field of study). The list of courses available for recommendation is obtained, for example, from online learning software. The list of courses is then sorted by the recommendation count so the highest-recommended courses (at the member level) appear at the top of the list. The top-ranked courses are then used in the aggregate course recommendations (e.g., a generalized course recommendation for all students in a particular field of study). In an embodiment, the aggregated course recommendations are output to a table that contains the fields employer-dept, job category, course, recommendation count, average recommendation score.

To identify the courses to recommend to a member or a set of members in the aggregate, operation 22 uses a pre-defined course to skill mapping table that maintains data linkages between particular skills and particular online courses. The course to skill mapping table is generated by extracting course title and description information from online learning software and creating data linkages with skills data based on, for example, meta data associated with the course data and/or keyword comparisons between the course data and the skills data. In one implementation, the course to skill mapping data is maintained in a HIVE table.

Skills Alignment Software

Figure 1B:
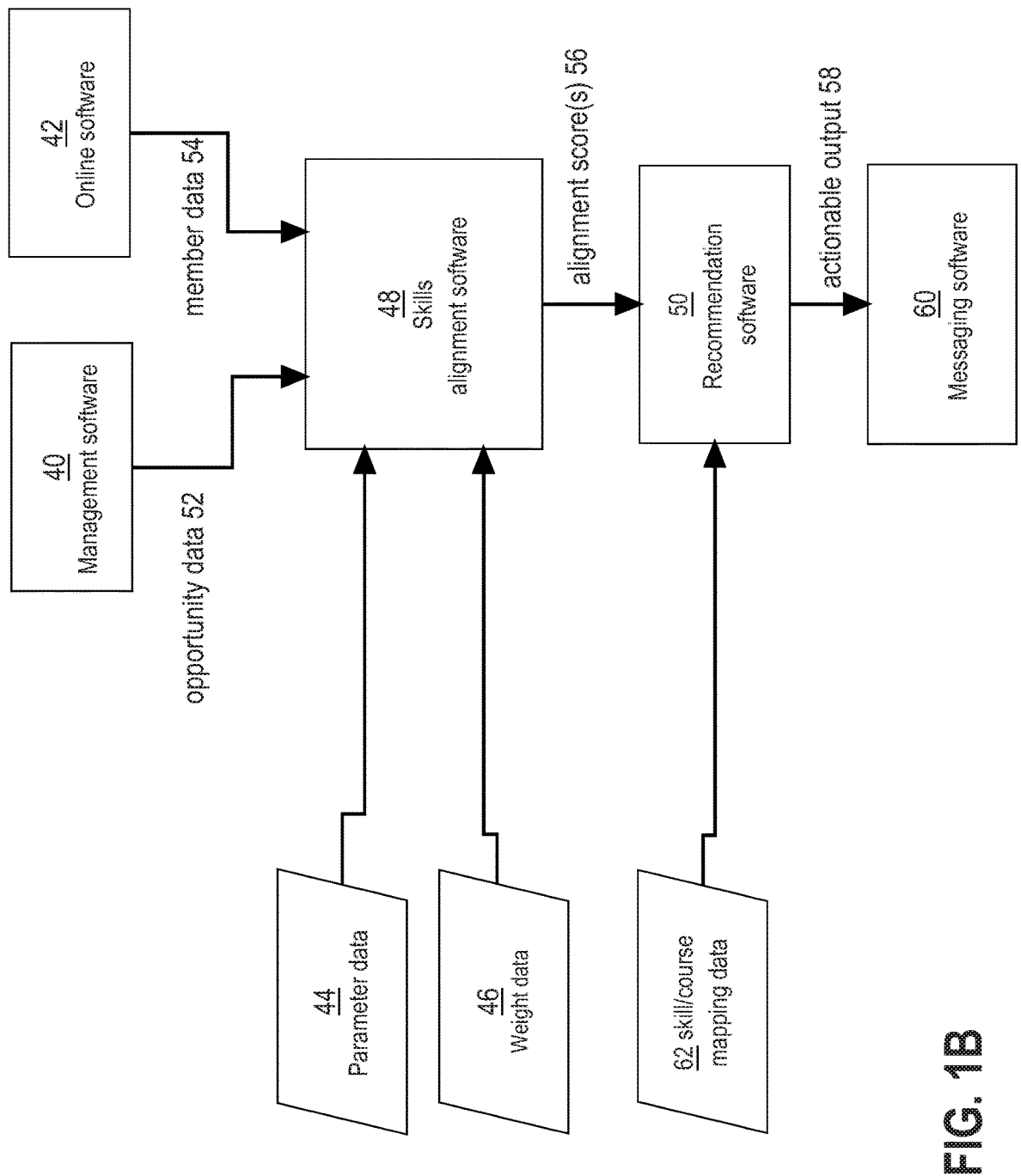
FIG. 1B is a block diagram that depicts an example software-based system for interfacing with multiple different data sources to produce actionable output based on a computational alignment of data sets that have an inferred data relationship, in an embodiment.

FIG. 1B is a block diagram that depicts an example system for providing an interface between a management system, an online system, and optionally, a learning system, in an embodiment. The software-based components of the system of FIG. 1B include management software 40, online software 42, skills alignment software 48, recommendation software 50, messaging software 60, parameter data 44, weight data 46, and skill/course mapping data 62.

Management software 40 is software that stores and manages skills data related to opportunities, such as a job listing service that provides a searchable database of job postings. An example of management software 40 is the "Jobs" component of the LINKEDIN mobile device software application, provided by LinkedIn Corporation of Sunnyvale, Calif. Other examples of management software 40 include other commercially available online job listing services.

Users of management software 40 may or may not be registered in the online software 42. In some embodiments, registered users of online software 42 are also, automatically, registered users of management software 40. In other embodiments, management software 40 includes a separate registration process. In those other embodiments, a portion of skills alignment system 120 creates and stores, in an electronic file or a mapping table, for example, a mapping that links the member registration data stored in online software 42 with the member registration data stored in management software 40, to facilitate the exchange of data between the two systems.

Online software 42 is software that is designed to provide an online networking service for its members, such as a professional networking service or an online social network service. End users become members of online software 42 through a registration process that includes establishing a user account identifier, password, and online profile. An example of online software 42 is the online professional social network service known as LINKEDIN, provided by LinkedIn Corporation of Sunnyvale, Calif. Other examples of online software 42 include other commercially available social network-based online services.

Skills alignment system 120 provides an interface through which a management system 102 and an online system 106 bidirectionally communicate data and/or computer instructions to one another. Skills alignment software 48 is implemented as part of skills alignment system 120, for example as part of score computation software 122, and is thereby operably coupled to management software 40 and online software 42, such as through network 140 shown in FIG. 1C, described below.

Skills alignment software 48 receives opportunity data 52 from management software 40 as a result of a data extraction and standardization process, which extracts the desired data and meta information from management software 40 and uses standardization rules to format and store the extracted data in an electronic file. The data extraction and standardization processes disclosed herein are implemented using computer code that is written in a programming language, such as Python.

Opportunity data 52 includes job records that contain job skills data. In some embodiments, opportunity data 52 also includes opportunity activity data. Opportunity activity data includes data indicative of the member's interactions with management software 40, which may be collected, with the member's permission or pursuant to a privacy policy, using cookies or other similar methods. Examples of opportunity activity data include search history data, including keywords used in online searches performed by the member, and view history data, including data indicative of job records viewed by the member within management software 40. In some embodiments, opportunity data is used to determine filter dimensions, described above.

Figure 3:
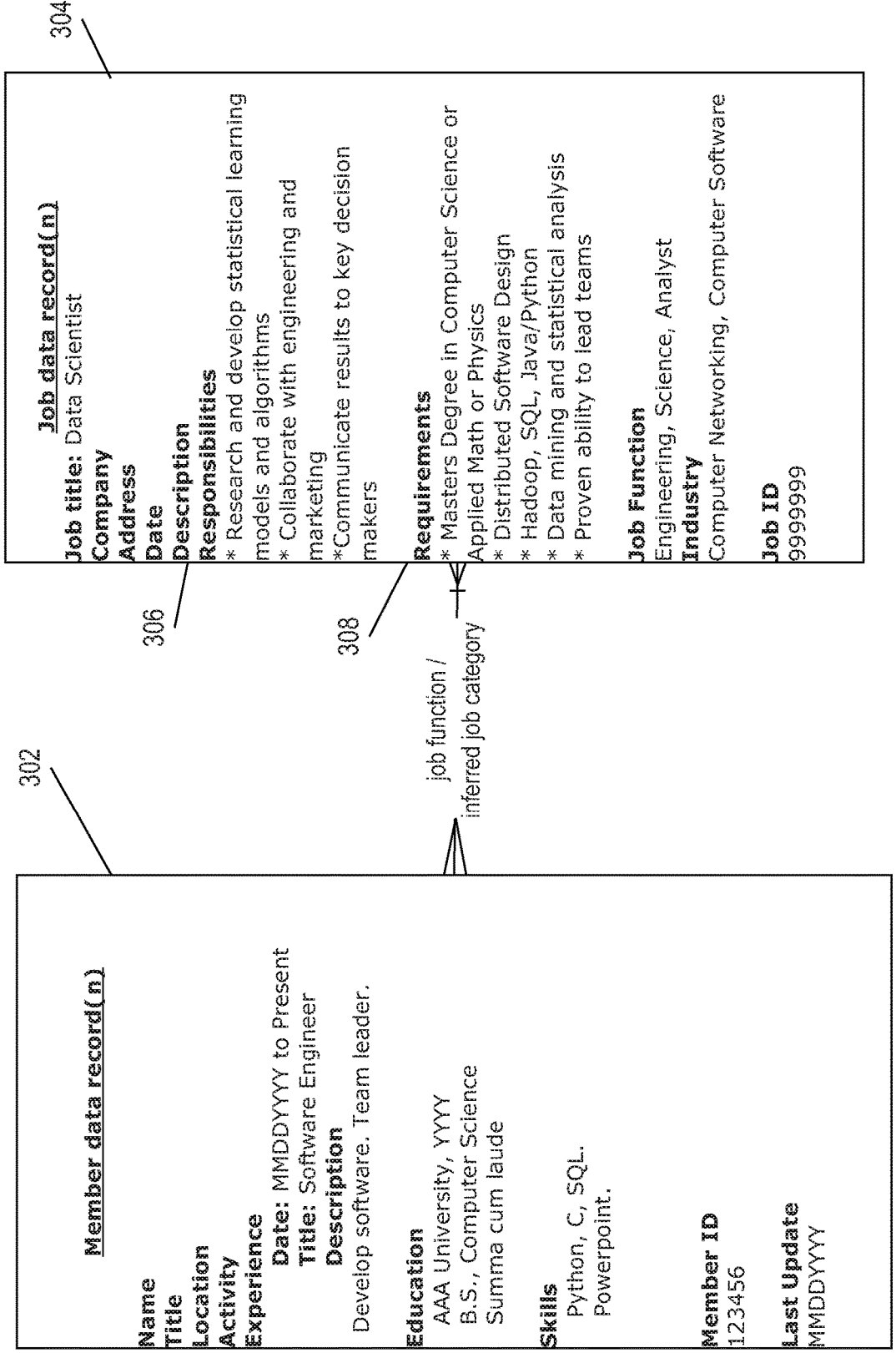
FIG. 3 is an example entity relationship diagram showing member data record(s) having inferred data relationships with opportunity data records, and includes examples of skills data within a member data record and skills data within an opportunity data record, and includes examples of sources of skills data within an opportunity data record, in an embodiment.

Opportunity data 52 may be implemented as an electronic data file that includes text-based data labeled with semantic tags, in an embodiment. For example, opportunity data 52 is created using JSON (JavaScript Object Notation), XML (Extensible Markup Language), or HTML (Hypertext Markup Language), in various embodiments. The semantic tags are, for example, meta tags, which are determined and applied according to a schema that is implemented by the data extraction and standardization process. Thus, the semantic tags are defined according to the requirements of a particular design or implementation of computing system 100. An example of opportunity data 52 is shown in FIG. 3, described below. As shown in FIG. 3 and described in more detail below, opportunity data 52 includes structured data and unstructured data, as well as meta data, in an embodiment.

Skills alignment software 48 receives member data 54 from online software 42 as a result of another data extraction and standardization process, which extracts the desired data and meta information from online software 42 and uses standardization rules to format and store the extracted data in an electronic file. The opportunity data 52 and member data 54 are heterogenous data sets; that is, the schema used by online software 42 is different from the schema used by management software 40, in an embodiment. Thus, although it may be implemented using similar computer code, the data extraction and standardization process used to extract information from online software 42 is different than the data extraction and standardization process used to extract information from management software 40, in an embodiment.

Member data 54 includes member records that contain member skills data. In some embodiments, member data 54 also includes member activity data. Member activity data includes data indicative of the member's interactions with online software 42, which may be collected, with the member's permission or pursuant to a privacy policy, using cookies or other similar methods. Examples of member activity data include search history data, including keywords used in online searches performed by the member, and view history data, including data indicative of member records viewed by the member within online software 42.

In embodiments in which skills alignment software 48 has access to activity data collected by either or both of management software 40 and online software 42 using approved methods, skills alignment software 48 uses the activity data to determine filter dimensions, described above.

Member data 54 may be an electronic data file that includes text-based data labeled with semantic tags, in an embodiment. For example, member data 54 is created using JSON (JavaScript Object Notation), XML (Extensible Markup Language), or HTML (Hypertext Markup Language), in various embodiments. The semantic tags are, for example, meta tags, which are determined and applied according to a schema that is implemented by the applicable data extraction and standardization process. Thus, the semantic tags are defined according to the requirements of a particular design or implementation of computing system 100. An example of member data 54 is shown in FIG. 3, described below. As shown in FIG. 3, described below, member data 54 includes structured data and unstructured data, as well as meta data, in an embodiment.

Parameter data 44 is attribute data that is associated with associated with job skills data. Parameter data 44 is adjustable programmatically or by user input, and may be stored in or referenced by opportunity data 52. Examples of parameter data 44 include threshold data values that control the number of skills extracted from the job skills data that are actually used to perform the comparison with member skills data. Parameter data 44 is used by skills alignment software 48 to determine, for example, a subset of the most important (or most common or most popular) skills extracted from the job skills data and use only that subset of most important skills to compute the aggregate alignment score. In some embodiments, parameter data 44 includes an adjustable matching parameter that is used by skills alignment software 48 to determine whether a member skill matches a job skill. For example, the adjustable matching parameter can be a threshold confidence value that has to be met or exceeded in order for the member skill and the job skill to be considered a match.

Weight data 46 is attribute data that is associated with job skills data and/or member skills data. Weight data is adjustable programmatically or by user input, and may be stored in or referenced by member data 54 and/or opportunity data 52. Examples of weight data 46 are numerical values that represent the relative importance of a particular skill in comparison to other skills in the job skills data or the member skills data, as the case may be. Weight data 46 is adjustable based on, for example, frequency of occurrence of a skill or strength of similarity between a job skill and a member skill, or a degree to which the skill is found in the job skills data but not found in the member skills data.

Skill/course mapping data 62 includes data linkages between skill data and course data, implemented in a database table, in some embodiments. In an embodiment, the skill/course mapping data 62 is pre-defined or obtained from an existing data source. In some embodiments, the data linkages that associate particular online courses with particular skills are established through an automated process that is supplemented with human input; for example, a semi-supervised machine learning-based process.

Skills alignment software 48 executes computer instructions that implement the processes shown in FIG. 1A, described above, and FIG. 2, described below, in an embodiment. Using opportunity data 52 and member data 54 as inputs, skills alignment software 48 executes the disclosed computational methods in accordance with the parameter data 44 and weight data 46 to produce alignment score(s) 56 and, in some embodiments, actionable output 58. Alignment score(s) 56 include aggregate alignment scores as shown and described herein. Actionable output 58 includes output produced by operation 22 of process 10, alone or in combination with output of other operations or processes, in an embodiment. In some embodiments, skills alignment software 48 transmits or otherwise makes available alignment score(s) 56 to recommendation software 50, which produces actionable output 58 using skill/course mapping data 52 as described above. An example of a software-based framework that is used, in some embodiments, to implement aspects of skills/opportunity alignment software is SPARK, maintained by the Apache Software Foundation. Other data analytics execution engines that are configured to operate on large data sets and to perform large-scale data processing can also be used.

In an embodiment, recommendation software 50 produces a visualization that includes at least the actionable output 58, which may include alignment score(s) 56. In some embodiments, actionable output 58 includes member-level course recommendations 58 and/or aggregate (group-level) course recommendations that are produced by recommendation software 50, as described above. Thus, in some embodiments, recommendation software 50 supplements actionable output produced by skills alignment software 48, which may include alignment score(s) 56, with additional output that includes targeted course recommendations. Example visualizations are shown in FIGS. 4A and 4B, described below.

Recommendation software 50 may be implemented within management software 40 or within online software 42 or within another software application (such as an online learning software platform), or may be implemented as a separate module as shown in FIG. 1B. In an embodiment, actionable output 58 includes a course recommendation that includes a deep link to an online course provided by learning system 126.

Messaging software 60 formulates electronic messages that include the targeted course recommendations that are produced by recommendation software 50. Messaging software 60 is a software-based component of messaging system 112 of FIG. 1C. In an embodiment, messaging software 60 auto-populates the address field of an electronic message with member address(es) of members that have been identified by skills alignment software 48 as good candidates for the particular course recommendation as a result of the computed skill mismatch. In some embodiments, messaging software 60 auto-populate the attachments section of an electronic message with a document or icon that includes a deep link to a recommended online course. In some embodiments, messaging software 60 addresses the electronic messages to a user account that is associated with an intermediary computing device 180 rather than directly addressing the electronic messages to members.

Networked System Example

Figure 1C:
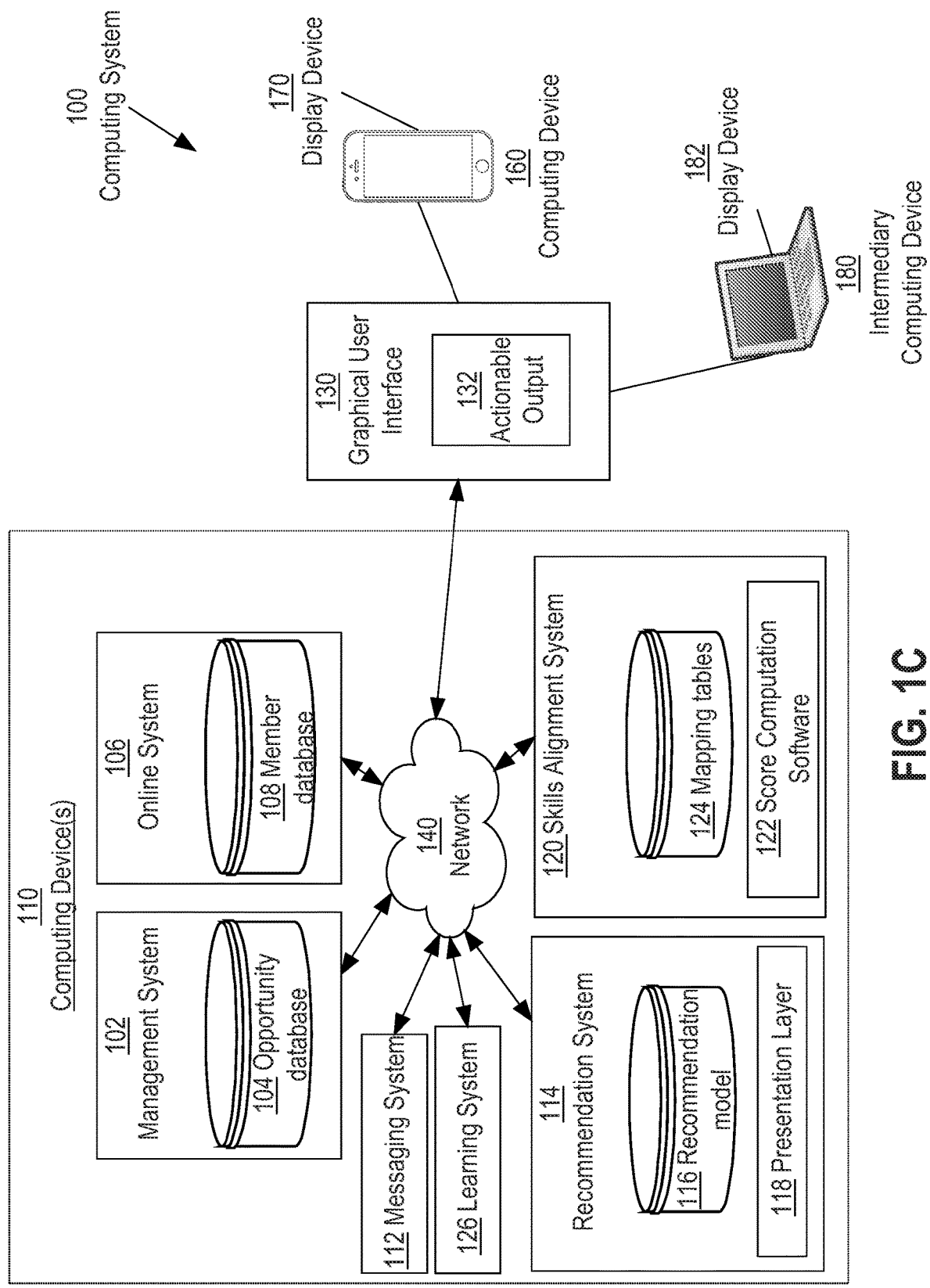
FIG. 1C is a block diagram of a networked computing system in which software for generating actionable output based on a computational alignment of data sets that have an inferred data relationship may be implemented, in an embodiment.

FIG. 1C is a block diagram of a networked computing system in which portions of skills alignment software may be implemented, for example as part of an interface between management software and online software and learning software, or as part of management software, or as part of online software, or as part of learning software.

Computing system 100 includes at least computing device (s) 110, computing device 160, display device 170, intermediary computing device 180, display device 182, which are communicatively coupled to an electronic communications network 140. Implemented in the devices 110, 160, 170, 180, 182 using computer software, hardware, or software and hardware, are combinations of automated functionality embodied in computer programming code, data structures, and digital data, which are represented schematically in FIG. 1 as management system 102, opportunity database 104, online system 106, member database 108, messaging system 112, recommendation system 114, recommendation model 116, presentation layer 118, skills alignment system 120, score computation software 122, mapping tables 124, learning system 126, graphical user interface 130, actionable output 132. System as used in this disclosure may refer to a single computer or network of computers and/or other devices. Computing device as used in this disclosure may refer to a computer or any other electronic device that is equipped with a processor. In some embodiments, intermediary computing device 180, 182 is used by a system administrator of learning system 126 to process actionable output and distribute various actionable output to member computing devices.

Although computing system 100 may be implemented with any number N (where N is a positive integer) of management system 102, opportunity database 104, online system 106, member database 108, skills alignment system 120, score computation software 122, mapping tables 124, messaging system 112, recommendation system 114, recommendation model 116, presentation layer 118, learning system 126, graphical user interface 130, computing devices 110, display devices 170, 182 and computing devices 160, 180, respectively, in this disclosure, these elements may be referred to in the singular form for ease of discussion.

Also, management system 102, opportunity database 104, online system 106, member database 108, skills alignment system 120, score computation module 122, mapping tables 124, messaging system 112, recommendation system 114, recommendation model 116, presentation layer 118, learning system 126, graphical user interface 130, computing devices 110, 180, display devices 170,182 and computing devices 160 are shown as separate elements in FIG. 1 for ease of discussion but the illustration is not meant to imply that separation of these elements is required. The illustrated systems (or their functionality) may be divided over any number of physical systems, including a single physical computer system, and can communicate with each other in any appropriate manner.

The illustrative management system 102, online system 106, member database 108, messaging system 112, recommendation system 114, skills alignment system 120, graphical user interface 130 are communicatively coupled to computing device(s) 160, 180 and to network 140. Portions of management system 102, online system 106, member database 108, learning system 126, messaging system 112, recommendation system 114, skills alignment system 120, graphical user interface 130 may be implemented as web-based software applications or mobile device applications and hosted by a hosting service (not shown). For example, graphical user interface 130 may be implemented within a front-end portion of management system 102 or within a front-end portion of online system 106, or may be embedded within another application. In an embodiment, portions of graphical user interface 130 are implemented in a web browser that can be executed on computing device 160.

In some embodiments, computing device(s) 160, 180 are client computing devices, such as an end user's smart phone, tablet computer, mobile communication device, wearable device, smart appliance, desktop computer, or laptop machine, and computing device 110 is a server computer or network of server computers located on the Internet, in the cloud. As illustrated in FIG. 1, display device 170,182 is implemented in computing device 160,180 but may be implemented as a separate device or as part of another device, or as multiple networked display devices, in other implementations.

The example management system 102 includes management software 40 and opportunity database 104, described above. Opportunity data 52 is stored in and includes subsets of opportunity database 104 that are determined by one or more filter dimensions, described above. Opportunity database 104 may be implemented as a searchable database system, such as a graph-based database system or a table-based relational database system or a hierarchical database system, for example. The opportunity data stored in opportunity database 104 may include numerous data records, where each data record may indicate, for example, a job identifier, a company name, an address, a phone number, a web address, a job title, a job description, a list of required skills.

Online system 106 includes online software 42 and member database 108. Member data 54, described above, is stored in and includes subsets of the data stored in member database 108 that are determined by one or more filter dimensions, described above. Member database 108 may be implemented as a searchable data structure, such as a graph-based database system or a relational database system. The member data stored in member database 108 may include numerous data records, where each data record may indicate, for example, a member identifier, a member name, an address, a phone number, a web address, education history data, job history data, a list of skills possessed by the member.

Skills alignment system 120 provides a programmable interface that is coupled to management system 102 and online system 106 and messaging system 112 via network 140, in an embodiment. Portions of skills alignment software 48, described above, are implemented as part of score computation software 122 of skills alignment system 120, in an embodiment. Skills alignment system 120 includes score computation software 122 and mapping tables 124. Score computation software 122 performs the pairwise skill alignment and score aggregation process that are described herein. Mapping tables 124 maintain the data linkages between member records, job records, and alignment scores, including the tuples that are generated by process 10, described above. Mapping tables also organize the data according to the requisite filter dimensions. In an embodiment, mapping tables 124 include course to skill mappings, job function to job category mappings, and job category job posting mappings.

Messaging system 112 is an electronic messaging system, such as a news feed, a video channel, a push notification system, a text notification system, or an email system, that includes messaging or email functionality. One specific but nonlimiting example of a messaging system is the news/content feed on the LINKEDIN professional social media platform. In some embodiments, messaging system 112 includes, as additional or alternative functionality, a text-to-speech processor that converts the text-based learning refresher items to synthesized speech, to produce audio-based course recommendations that are output through one or more speakers.

Recommendation system 114 provides course recommendations that are generated using recommendation model 116 and presented via presentation layer 118. Recommendation model 116 includes a regression-based model for member-level course recommendations and a mapping table for aggregate course recommendations, in some embodiments. Portions of recommendation software 50, described above, are implemented as part of recommendation system 114, in an embodiment. Presentation layer 118 is server-side software that provides data conversion and data translation services, in an embodiment. Presentation layer 118 facilitates the generation of actionable output 132 that includes course recommendations produced by recommendation model 116, for presentation by graphical user interface 130, in an embodiment.

Learning system 126 is an online learning platform, such as LINKEDIN LEARNING, available from LinkedIn Corporation of Sunnyvale, Calif. Other examples of learning system 126 are other commercially available online learning systems. Learning system 126 supplies course data that skills alignment system 120 uses to create mapping tables 124, including a mapping table that stores course to skill/course mapping data 62.

Network 140 is an electronic communications network and may be implemented on any medium or mechanism that provides for the exchange of data between the devices that are connected to the network. Examples of network 140 include, without limitation, a network such as a Local Area Network (LAN), Wide Area Network (WAN), Ethernet or the Internet, or one or more terrestrial, satellite or wireless links.

Computing device 160 communicates with display device 170 and operates graphical user interface 130 to establish logical connection(s) over network 140 with portions of management system 102, online system 106, messaging system 112, recommendation system 114, either directly or via skills alignment system 120. Actionable output 132 is an arrangement of graphical user interface elements, such as an interactive elements and links, in an embodiment. Actionable output 132 can be embedded in an email message or a text message or a web-based application front end or a mobile device application front end, using for example an HTML (Hyper-Text Markup Language) document. In some embodiments, actionable output 132 includes audio output or a combination of audio and visual output. Examples of actionable output 132 are shown in FIGS. 4A and 4B, described below.

Computation of Alignment Scores

FIG. 2 is flow diagram that depicts a process for computationally aligning aggregated data of heterogenous datasets using data records that are in a many-to-many relationship to produce actionable output, in an embodiment. Process 200 may be performed by a single entity or program or by multiple entities or programs, including for example a browser plug-in and a remote server. The operations of the process as shown in FIG. 2 can be implemented using processor-executable instructions that are stored in computer memory. For purposes of providing a clear example, the operations of FIG. 2 are described as performed by computing device(s) 110, 160, which may be individually or collectively referred to as simply a 'computing system.'

In operation 202, process 200 determines member skills data based on member records obtained from online system, for example by operation 12, described above. To do this, process 200 receives a data file that contains the member skills data from a data extraction and standardization process, in an embodiment.

In operation 204, process 200 determines job skills data based on job records obtained from management system, for example by operation 14, described above. To do this, process 200 receives a data file that contains the job skills data from a data extraction and standardization process, in an embodiment. In some embodiments, process 200 assigns weight values to each of the individual job skills in the job skills data, where the weight values are based on frequency of occurrence of the skill, confidence data representing a likelihood that the job skill matches a member skill, and/or other factors.

In an embodiment, the weight values are determined based on source data that is associated with the job skills data. The source data is indicative of a subsection in which the job skills data is located within a job record. Examples of sources include labels of subsections of the job record, such as "Industry," "Responsibilities" and "Requirements." Sources that are known or likely to contain structured data are weighted more highly than sources that contain unstructured data, in an embodiment.

In operation 206, process 200 ranks the job skills data based on the weight data, such as the weight values that are associated with the source data within the job records and/or confidence data that is associated with the job skills data. Process 200 sorts the list of weighted skills so that the highest-ranking skills are at the top of the list.

In operation 208, process 200 selects a subset of the job skills data using an adjustable parameter. To do this, process 200 selects the top N skills starting from the top of the skills list, where N is a positive integer, and uses those selected skills to perform the matching operations with the member skills data. The value of N is set by an adjustable parameter, in accordance with the requirements or design of a particular implementation of the system.

In operation 210, process 200 determines alignment data for each pair of member skills data and job skills data, for each instance of job skills data in the subset of the job skills data, using an adjustable matching parameter. To do this, process 200 reads an instance of job skills data and looks for a match in the member skills data, and then repeats the process for all instances of job skills data in the subset of job skills data established by operation 208. In an embodiment, process 200 looks for an exact keyword match between the job skill and the member skill; for example, "Python" matches "Python."

In other embodiments, process 200 supplements the existing subset of job skills with skills that are (i) inferred based on a rule associated with an instance of job skills data in the existing set of job skills data or (ii) implied based on a semantic interpretation of the instance of job skills data in the existing set of job skills data or a combination of (i) and (ii), and then matches the supplemented list with the member skill data. An example of process 200 inferring a skill based on a rule that is associated with an instance of job skills data is the use of a rule that establishes a dependency relationship between two skills, for example, if skill A is required, then skill B is also required. An example of process 200 implying a skill is the use of a glossary, vocabulary, dictionary, lexicon, ontology, or language model to add synonyms or alternative forms of a skill to the set of job skills data. The adjustable matching parameter is a data that indicates which one(s) of the various approaches to skill matching the system is to use in a particular instance. For example, the adjustable matching parameter may specify that only the exact matching is performed when the source of the skill indicates structured data and that all three forms of matching: exact, inferred, and implied, are performed when the source of the skill indicates unstructured data.

In operation 212, process 200 aggregates the alignment data across all instances of job skills data in the subset of the job skills data to produce an aggregate alignment score for the member records determined in operation 202. A detailed example of an aggregation of alignment data is provided in Table 1, below.

TABLE 1

Example of alignment data.

| Skill Name | Required by Jobs in Set | Possessed by Members in Set |
|---|---|---|
| Java | 1 | 1 |
| Python | 2/3 | 0 |
| Tableau | 1/3 | 0 |
| R | 1/3 | 0 |

In the example of Table 1, there are 3 jobs in the set of job skills data. Job J1 requires Java and Python; Job J2 requires Python, Tableau, and Java, and Job J3 requires R and Java. Assuming equal weighting of the jobs J1-J3, the weight for each job skill is ⅓. Thus, since Java is required by all three of J1, J2, and J3, its total requirement across the entire job set is equal to ⅓*3=1. Similarly, since Python is required by 2 of the three jobs, its total requirement across the entire job set is ⅔. Likewise, the total requirement for each of Tableau and R across the entire job set is ⅓.

In the example of Table 1, only Java was found in the member skill data. Thus, using a similar computation, it is determined that the member possess score is ⅓*3=1 for Java and 0 for each of the other skills. Next, a total aggregate alignment score is computed as: (total member possessed score)/(total job requirements). Using the above example, the computation is 1/(1+⅔+⅓+⅓)=³⁄₇. The top ranked job skill that is missing from the member skill set is Python, followed by Tableau and R. The aggregate alignment score produces actionable output in that it identifies particular skills that the member needs to acquire if the member is interested in pursuing the jobs in the identified group of jobs.

Example of Heterogenous Data Sets

FIG. 3 is an example entity relationship diagram showing a member data record having a many to many relationship with opportunity data records that is defined by an inferred data relationship (job function to inferred job category), in an embodiment. FIG. 3 includes examples of skills data within a member data record 302, which includes both structured data ("Skills") and unstructured data ("Description"). FIG. 3 also includes examples of skills data within a job data record 304, and identifies examples of sources 306, 308 of skills data within an opportunity data record. As described above, weight data can be associated with sources 306, 308. The data records 302, 304 are heterogenous in that they are implemented using different schema. For example, member data record 302 includes a Skills section that contains structured data, while job data record 304 contains a Requirements section that contains unstructured data.

Examples of Actionable Output

FIGS. 4A and 4B are screen captures of examples of actionable output, in an embodiment. Output 410, 420 are designed to be displayed in graphical user interface 130, in an embodiment. In FIG. 4A, the screen capture 410 includes member-level course recommendations 412, 414, which are generalized based on techniques other than the skills alignment approaches disclosed herein. For example, interviewing skills 412 and negotiation 414 are course recommendations that are applicable to a wide range of end users, determined based on search history, for example, and may or may not address a particular skill mismatch between a set of member records and a set of job records.

FIG. 4B is a screen capture 420 of a user interface that is generated as a result of the skill alignment computations performed for a particular set of member records as described herein. Screen capture 420 displays a ranked list 422, which includes titles of skills that are identified as a result of the skill alignment processes described herein. Screen capture 420 also displays a set of icons (e.g., a thumbnail image) 424, 426, each of which represents an individual member in the set of member records for which the skill alignment computations were performed. For example, the set of icons corresponds to the employees of a particular company department or project team.

The user interface of screen capture 420 is dynamic in that the information presented changes depending upon which skill title is selected in the list 422. In the illustration of FIG. 4B, the skill title, "Agile Project Management" has been selected, as indicated by underlining. As a result of this selection, the user interface highlights the icons that correspond to members who have been identified by the disclosed skill alignment processes as needing the selected skill, i.e., as a result of the disclosed processes concluding both that a) the skill is important for this particular set of member records (e.g. by the skill ranking process described above) and b) that this particular member does not have the skill listed in his or her profile (e.g., by the matching processes described above). In the illustration of FIG. 4B, the highlighting is indicated by bounding boxes around the relevant images, as shown with respect to icon 424. Icons that correspond to members who have been determined through the disclosed processes not to need the selected skill are not highlighted, as shown with respect to icon 426. If a different skill title in the list is selected, the highlighting of icons would change in accordance to the computed skill alignments corresponding to the newly selected skill.

FIG. 4B also illustrates actionable output 428, 430 that are generated based on the skill alignment processes described herein. The actionable output 428, 430 represent course recommendations that are specifically tailored to address the skill that is highlighted in the skill list 422 (e.g., Agile Project Management). In the illustration of FIG. 4B, the actionable output 428, 430 includes course data (such as the course name and a corresponding image 432) as well as an interactive select button 434.

The select button 434, when activated, launches messaging software 60 and generates a draft electronic message that includes a link to the selected course 428, 430 and, in an embodiment, populates the address field of the electronic message with the member address(es) of the member(s) that are in need of the selected skill, as indicated by the highlighting in the top portion of the screen capture shown in FIG. 4B. In other embodiments, activation of the select button 434 auto-populates the address field of the electronic message with all of the member addresses of all of the members in the set of members (e.g., all members of the team/group/department). The member address information is obtained by messaging software 60 from the member database 108. The course data, including link information, is obtained from skill/course mapping data 62 and learning system 126. References to "obtaining" data herein refer to executing computer code to perform data retrieval operations, such as search queries on databases and/or other data stores, in some embodiments.

In some embodiments, the user interface 420 is displayed with an admin portal of an online learning system, such that a learning administrator at an enterprise that utilizes the online learning system can review the targeted recommendations and approve the auto-generated electronic messages before the messages are sent to the relevant members. This allows the learning administrator to customize or personalize the electronic messages.

FIG. 4B illustrates group-level course recommendations and actionable output. Alternatively or in addition, in some embodiments, the disclosed system produces individual member-level course recommendations and actionable output in a similar manner using the skill alignment scores produced by the process of FIG. 2, for example. In those embodiments, the course recommendations are targeted to individual members of the member group and may differ from the group-level recommendations because they are based on the individual member's profile data, goals, etc.

It should be noted that the disclosed alignment scores and actionable outputs are dynamic. That is, as member data records and job records are updated with new skills and other information, the aggregate alignment score and corresponding actionable output changes automatically as well.

Benefits

Benefits that may be realized by at least some embodiments described herein include improving the effectiveness of opportunity recommendations provided by management software or learning software. Using the disclosed approaches, opportunity recommendations are robust to attempts to 'game the system' with specially manipulated or engineered data sets. More generally, the disclosed approaches facilitate enhanced cooperation between management systems, online systems, and learning systems through the incorporation of the above-described computational alignment processes.

Implementation Example—Hardware Overview

According to one embodiment, the techniques described herein are implemented by one or more computing devices. For example, portions of the disclosed technologies may be at least temporarily implemented on a network including a combination of one or more server computers and/or other computing devices. The computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

Figure 5:
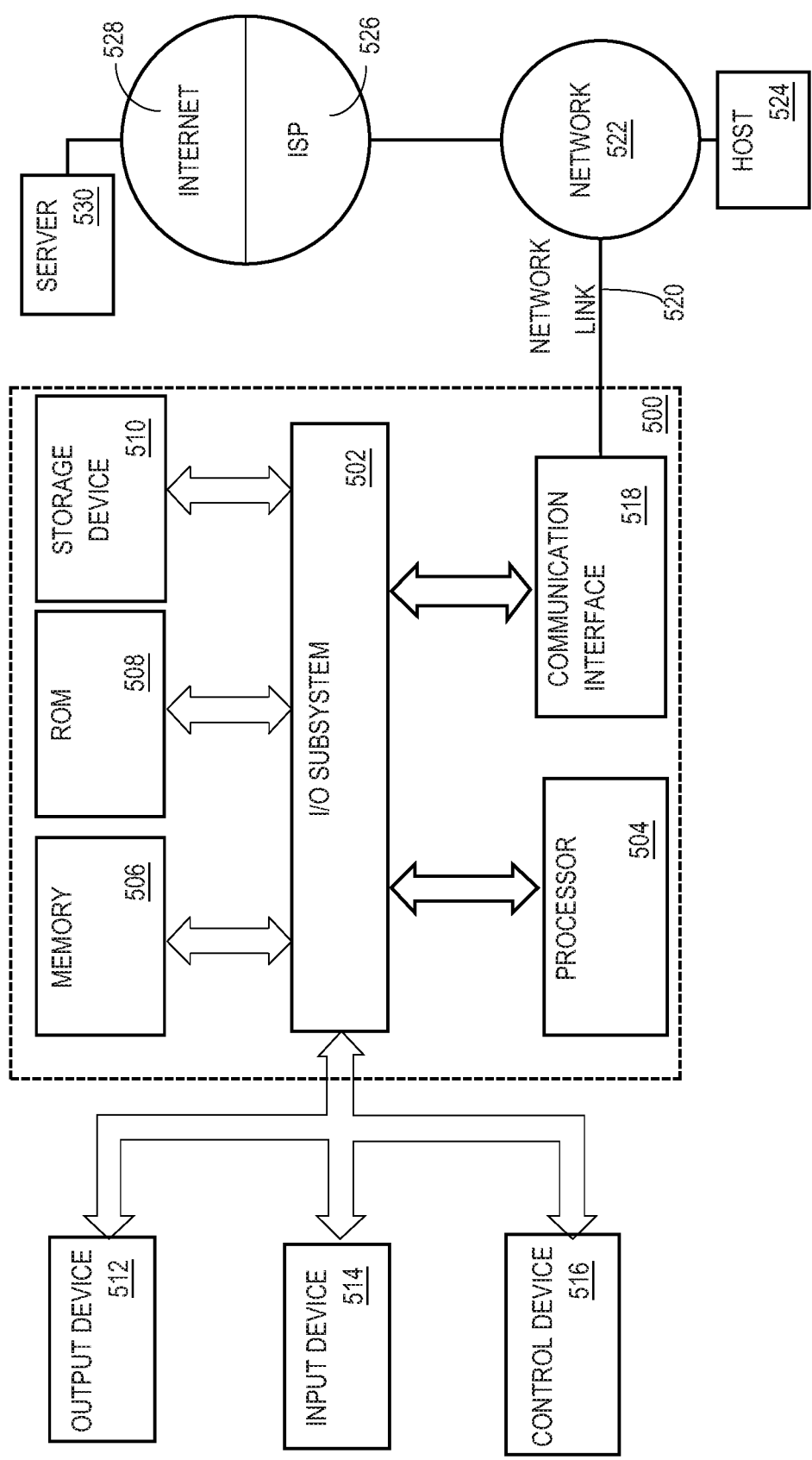
FIG. 5 is a block diagram that illustrates a computer system upon which an embodiment of the invention may be implemented.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to one or more output devices 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Additional Examples

Illustrative examples of the technologies disclosed herein are provided below. An embodiment of the technologies may include any of the examples or a combination of the described below.

In an example 1, a method includes obtaining, from an online system, a set of member records; inferring a job category based at least partly on job function data extracted from the set of member records; obtaining, from the management system, a set of job records that correspond to the inferred job category; calculating an aggregate alignment score by comparing member skills data extracted from the set of member records to job skills data extracted from the set of job records, wherein the aggregate alignment score is a measure of a mismatch between the member skills data for the set of member records and the job skills data for the set of job records; based on the aggregate alignment score, identifying a skill that is actionable to address the mismatch between the member skills data and the job skills data; generating actionable output that replaces, modifies, or supplements first course recommendation data that does not map to the identified skill with second course recommendation data that maps to the identified skill; wherein the method is performed by one or more computing devices.

An example 2 includes the method of example 1, and includes adjusting a weight assigned to a skill in the job skills data based on goal data obtained from user input. An example 3 includes the method of example 1 or example 2, and includes determining an alignment score for a particular member record of the set of member records by comparing member skills data extracted from the particular member record to job skills data extracted from the set of job records, wherein the alignment score is a measure of a mismatch between the member skills data for the particular member record and the job skills data for the set of job records; based on the alignment score, generating second actionable output that replaces, modifies, or supplements the actionable output when the identified skill is actionable to address the mismatch between the member skills data extracted from the particular member record and the job skills data. An example 4 includes the method of any of examples 1-3, wherein the actionable output comprises an arrangement of graphical user interface elements that includes a list of selectable skills, a thumbnail image that represent a member record that is aligned with a selected skill of the list of selectable skills, and an icon that represents an online course that is aligned with the selected skill. An example 5 includes the method of any of examples 1-4, wherein the actionable output comprises an electronic message that is auto-populated with the second course recommendation data. An example 6 includes the method of any of examples 1-5, wherein the actionable output comprises an electronic message that is auto-populated with member address data of member records that are aligned with the second course recommendation data. An example 7 includes the method of any of examples 1-6, comprising sending an electronic message comprising the actionable output to an intermediary computer that is coupled to a learning system that provides at least one online course that is identified in the second course recommendation data.

In an example 8, a system includes one or more computer processors; an alignment system coupled to the one or more computer processors, wherein the alignment system performs operations comprising: obtaining, from an online system, a set of member records; inferring a job category based at least partly on job function data extracted from the set of member records; obtaining, from the management system, a set of job records that correspond to the inferred job category; calculating an aggregate alignment score by comparing member skills data extracted from the set of member records to job skills data extracted from the set of job records, wherein the aggregate alignment score is a measure of a mismatch between the member skills data for the set of member records and the job skills data for the set of job records; based on the aggregate alignment score, identifying a skill that is actionable to address the mismatch between the member skills data and the job skills data; generating actionable output that replaces, modifies, or supplements first course recommendation data that does not map to the identified skill with second course recommendation data that maps to the identified skill.

An example 9 includes the system of example 8, wherein the alignment system performs operations comprising adjusting a weight assigned to a skill in the job skills data based on goal data obtained from user input. An example 10 includes the system of example 8 or example 9, wherein the alignment system performs operations comprising: determining an alignment score for a particular member record of the set of member records by comparing member skills data extracted from the particular member record to job skills data extracted from the set of job records, wherein the alignment score is a measure of a mismatch between the member skills data for the particular member record and the job skills data for the set of job records; based on the alignment score, generating second actionable output that replaces, modifies, or supplements the actionable output when the identified skill is actionable to address the mismatch between the member skills data extracted from the particular member record and the job skills data. An example 11 includes the system of any of examples 8-10, wherein the actionable output comprises an arrangement of graphical user interface elements that includes a list of selectable skills, a thumbnail image that represent a member record that is aligned with a selected skill of the list of selectable skills, and an icon that represents an online course that is aligned with the selected skill. An example 12 includes the system of any of examples 8-11, wherein the actionable output comprises an electronic message that is auto-populated with the second course recommendation data. An example 13 includes the system of any of examples 8-12, wherein the actionable output comprises an electronic message that is auto-populated with member address data of member records that are aligned with the second course recommendation data. An example 14 includes the system of any of examples 8-13, wherein the alignment system performs operations comprising sending an electronic message comprising the actionable output to an intermediary computer that is coupled to a learning system that provides at least one online course that is identified in the second course recommendation data.

In an example 15, a computer program product includes one or more non-transitory computer-readable storage media comprising instructions which, when executed by one or more processors, cause: obtaining, from an online system, a set of member records; inferring a job category based at least partly on job function data extracted from the set of member records; obtaining, from the management system, a set of job records that correspond to the inferred job category; calculating an aggregate alignment score by comparing member skills data extracted from the set of member records to job skills data extracted from the set of job records, wherein the aggregate alignment score is a measure of a mismatch between the member skills data for the set of member records and the job skills data for the set of job records; based on the aggregate alignment score, identifying a skill that is actionable to address the mismatch between the member skills data and the job skills data; generating actionable output that replaces, modifies, or supplements first course recommendation data that does not map to the identified skill with second course recommendation data that maps to the identified skill.

An example 16 includes the computer program product of example 15, wherein the instructions, when executed by the one or more processors, cause adjusting a weight assigned to a skill in the job skills data based on goal data obtained from user input. An example 17 includes the computer program product of example 15 or example 16, wherein the instructions, when executed by the one or more processors, cause: determining an alignment score for a particular member record of the set of member records by comparing member skills data extracted from the particular member record to job skills data extracted from the set of job records, wherein the alignment score is a measure of a mismatch between the member skills data for the particular member record and the job skills data for the set of job records; based on the alignment score, generating second actionable output that replaces, modifies, or supplements the actionable output when the identified skill is actionable to address the mismatch between the member skills data extracted from the particular member record and the job skills data. An example 18 includes the computer program product of any of examples 15-17, wherein the actionable output comprises an arrangement of graphical user interface elements that includes a list of selectable skills, a thumbnail image that represent a member record that is aligned with a selected skill of the list of selectable skills, and an icon that represents an online course that is aligned with the selected skill. An example 19 includes the computer program product of any of examples 15-18, wherein the actionable output comprises an electronic message that is auto-populated with the second course recommendation data and member address data of one or more member records that are aligned with the second course recommendation data. An example 20 includes the computer program product of any of examples 15-19, wherein the instructions, when executed by the one or more processors, cause sending an electronic message comprising the actionable output to an intermediary computer that is coupled to a learning system that provides at least one online course that is identified in the second course recommendation data.

GENERAL CONSIDERATIONS

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   retrieving, from computer memory, an aggregate alignment score that has been computed by at least one processor aggregating individual alignment scores over a set of user records obtained from an online system, an individual alignment score having been determined by comparing user skills data extracted from an individual user record of the set of user records to job skills data extracted from a set of job records that have been obtained from a management system and correspond to a job category determined by information included in the set of user records;
   causing presentation of a graphical user interface that displays an arrangement of graphical user interface elements that includes a list of end-user selectable skills that have been identified based on the aggregate alignment score, and one or more icons, each icon identifying a user associated with a user record of the set of user records used to compute the aggregate alignment score;
   in response to a selection of a particular skill in the list of the end-user selectable skills via the graphical user interface, dynamically causing the graphical user interface to i) highlight one or more particular icons when an individual alignment score associated with the one or more particular icons indicates that the user identified by the icon needs to acquire the particular skill, and ii) present a link to an online course that is aligned with the selected skill; and
   in response to the selection of the link to the online course via the graphical user interface, generating an electronic message that is auto-populated with the link to the online course that is aligned with the selected skill;
   wherein the method is performed by one or more computing devices.

2. The method of claim 1, comprising adjusting a weight assigned to a skill in the job skills data based on goal data obtained from user input.

3. The method of claim 1, comprising:
- determining an individual alignment score for a particular user record of the set of user records by comparing user skills data extracted from the particular user record to job skills data extracted from the set of job records, wherein the alignment score is a measure of a mismatch between the user skills data for the particular member record and the job skills data for the set of job records; and
- based on the individual alignment score, generating output for presentation via the graphical user interface when a skill in the list of end-user selectable skills is actionable to address the mismatch between the user skills data extracted from the particular user record and the job skills data.

4. The method of claim 1, wherein, in response to the selection of the link to the online course via the graphical user interface, generating an electronic message that is auto-populated with address data of user records that are aligned with the selected skill.

5. A system comprising:
- one or more computer processors;
- one or more non-transitory computer readable media coupled to the one or more computer processors comprising instructions capable of performing operations comprising:
- retrieving, from computer memory, an aggregate alignment score that has been computed by at least one processor aggregating individual alignment scores over a set of user records obtained from an online system, an individual alignment score having been determined by comparing user skills data extracted from an individual user record of the set of user records to job skills data extracted from a set of job records that have been obtained from a management system and correspond to a job category determined by information included in the set of user records;
- causing presentation of a graphical user interface that displays an arrangement of graphical user interface elements that includes a list of end-user selectable skills that have been identified based on the aggregate alignment score, and one or more icons, each icon identifying a user associated with a user record of the set of user records used to compute the aggregate alignment score;
- in response to a selection of a particular skill in the list of the end-user selectable skills via the graphical user interface, dynamically causing the graphical user interface to i) highlight one or more particular icons when an individual alignment score associated with the one or more particular icons indicates that the user identified by the icon needs to acquire the particular skill, and ii) present a link to an online course that is aligned with the selected skill; and
- in response to the selection of the link to the online course via the graphical user interface, generating an electronic message that is auto-populated with a link to the online course that is aligned with the selected skill.

6. The system of claim 5, wherein the instructions are capable of performing operations comprising adjusting a weight assigned to a skill in the job skills data based on goal data obtained from user input.

7. The system of claim 5, wherein the instructions are capable of performing operations comprising:
- determining an individual alignment score for a particular user record of the set of user records by comparing user skills data extracted from the particular user record to job skills data extracted from the set of job records, wherein the alignment score is a measure of a mismatch between the user skills data for the particular user record and the job skills data for the set of job records; and
- based on the individual alignment score, generating output for presentation via the graphical user interface when a skill in the list of end-user selectable skills is actionable to address the mismatch between the user skills data extracted from the particular user record and the job skills data.

8. The system of claim 5, wherein, in response to the selection of the link to the online course via the graphical user interface, generating an electronic message that is auto-populated with address data of user records that are aligned with the selected skill.

9. A computer program product comprising:
- one or more non-transitory computer-readable storage media comprising instructions which, when executed by one or more processors, cause:
- retrieving, from computer memory, an aggregate alignment score that has been computed by at least one processor aggregating individual alignment scores over a set of user records obtained from an online system, an individual alignment score having been determined by comparing user skills data extracted from an individual user record of the set of user records to job skills data extracted from a set of job records that have been obtained from a management system and correspond to a job category determined by information included in the set of user records;
- causing presentation of a graphical user interface that displays an arrangement of graphical user interface elements that includes a list of end-user selectable skills that have been identified based on the aggregate alignment score, and one or more icons, each icon identifying a user associated with a user record of the set of user records used to compute the aggregate alignment score;
- in response to a selection of a particular skill on the list of the end-user selectable skills via the graphical user interface, dynamically causing the graphical user interface to i) highlight one or more particular icons when an individual alignment score associated with the one or more particular icons indicates that the user identified by the icon needs to acquire the particular skill, and ii) present a link to an online course that is aligned with the selected skill; and
- in response to the selection of the link to the online course via the graphical user interface, generating an electronic message that is auto-populated with a link to the online course that is aligned with the selected skill, and user address data of one or more user records that are aligned with the selected skill.

10. The computer program product of claim 9, wherein the instructions, when executed by the one or more processors, cause adjusting a weight assigned to a skill in the job skills data based on goal data obtained from user input.

11. The computer program product of claim 9, wherein the instructions, when executed by the one or more processors, cause:
- determining an individual alignment score for a particular user record of the set of user records by comparing user skills data extracted from the particular user record to job skills data extracted from the set of job records, wherein the alignment score is a measure of a mismatch between the user skills data for the particular user record and the job skills data for the set of job records; and based on the individual alignment score, generating output for presentation via the graphical user interface when a skill in the list of end-user selectable skills is actionable to address the mismatch between the user skills data extracted from the particular user record and the job skills data.

\* \* \* \* \*